L. E. ASKEW & W. H. SANGSTER.
Corn-Planters.

No. 154,365. Patented Aug. 25, 1874.

UNITED STATES PATENT OFFICE.

LAFAYETTE E. ASKEW AND WILLIAM H. SANGSTER, OF GREENVILLE, KY.

IMPROVEMENT IN CORN-PLANTERS.

Specification forming part of Letters Patent No. 154,365, dated August 25, 1874; application filed June 27, 1874.

*To all whom it may concern:*

Figure 1:
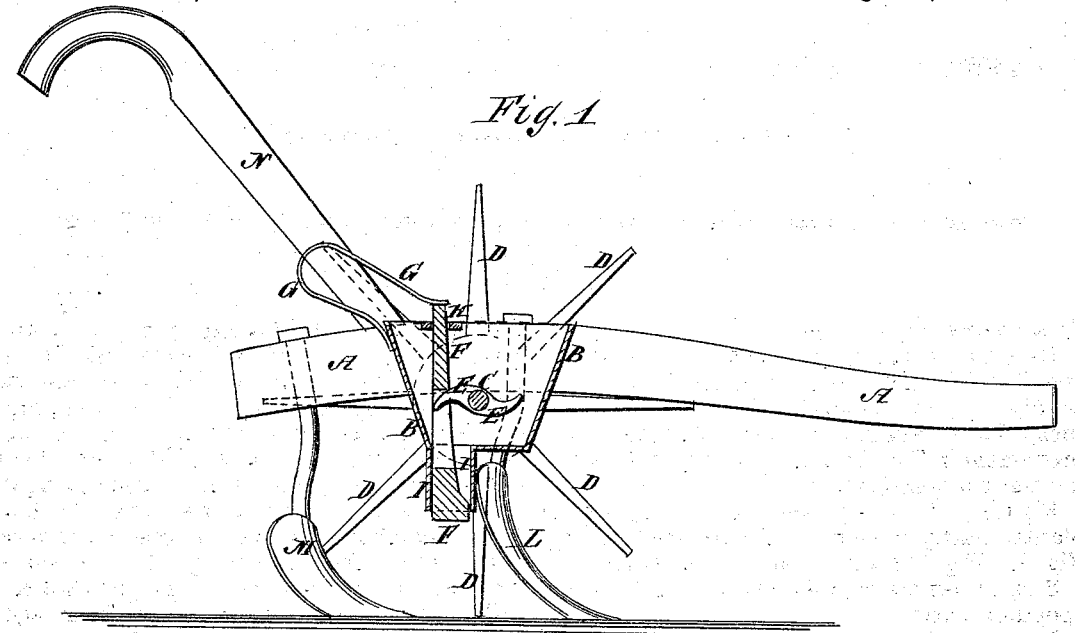
Figure 2:
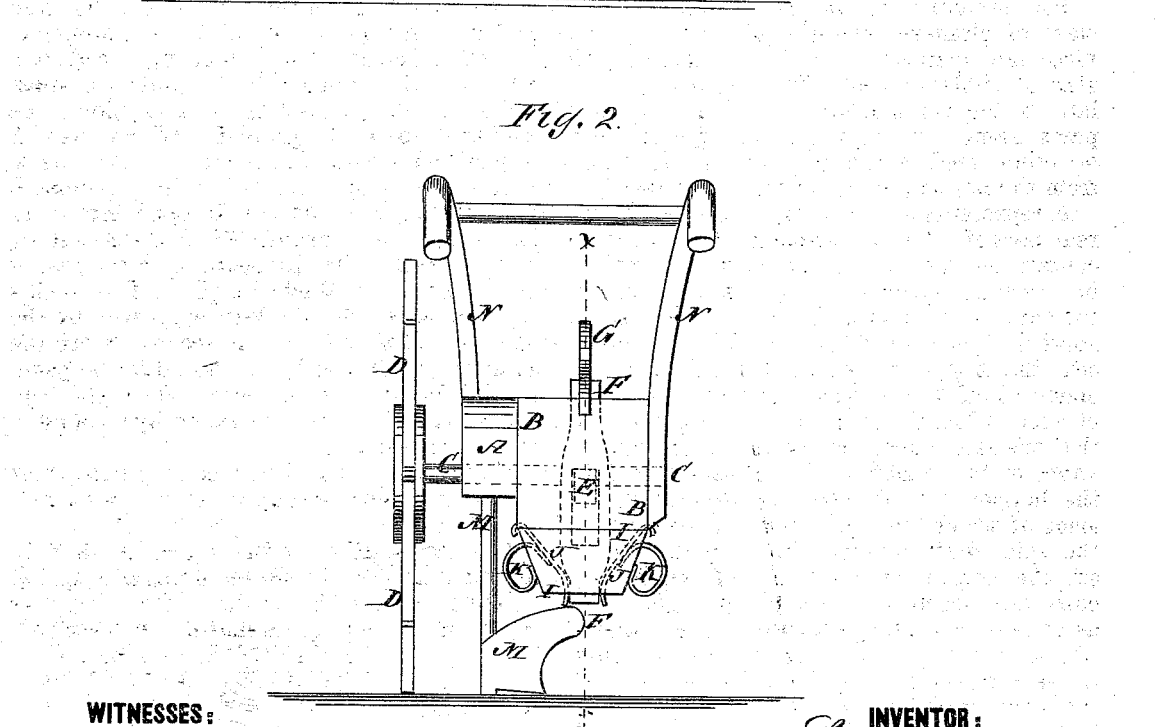

Be it known that we, LAFAYETTE E. ASKEW and WM. H. SANGSTER, of Greenville, in the county of Muhlenburg and State of Kentucky, have invented a new and useful Improvement in Corn-Planters, of which the following is a specification:

Figure 1 is a side view of our improved planter, partly in section, through the line $x\,x$, Fig. 2. Fig. 2 is a rear view of the same.

Similar letters of reference indicate corresponding parts.

The invention is an improvement in the class of planters whose seed-delivering devices are operated through the medium of a star or rimless wheel. The improvement relates to the combination and arrangement of parts named in the claim, whereby the corn or other seed is agitated in and delivered from the hopper, as hereinafter described.

A represents a plow-beam, to the side of the rear part of which is attached a hopper, B, to contain the seed. C is a shaft, which revolves in bearings attached to the beam A, and to the sides of the hopper B. To the end of the shaft C, upon the side of the beam A opposite the hopper B, is attached an armed or spoke wheel, D, the spokes of which are made of such a length as to reach the ground, so that the said wheel may be turned by the advance of the machine. To the shaft C, within the hopper B, is attached a cross-bar, E, the arms of which are made cam-shaped, and, as the said shaft revolves, not only agitate or stir the corn or other seed in the hopper, but enter alternately a slot in the plunger, F, so as to raise said plunger twice at each revolution of the wheel D. The plunger F, when released from the cams E, is forced down by the bent spring G, one end of which is attached to the hopper B, and its other end rests upon the upper end of the plunger F.

The upper end of the plunger F moves up and down in a guide-hole in a cross-bar, H, attached to the top of the hopper B, and its lower end passes down into the dropping-chamber I, attached to the bottom of the hopper B. In the side parts of the chamber I are pivoted the upper ends of two plates, J, the lower ends of which project at the bottom of the chamber I, and are pressed inward or toward each other by springs K, attached to the sides of said chamber. The plates J are so formed that when the plunger F is raised, a cavity will be formed between the said plates J and the lower end of the plunger F, of such a size as to contain enough seed for a hill. As the plunger F descends, its lower end forces the plates J apart, and allows the seed to drop to the ground. To the beam A is attached a plow, L, in such a position as to open a furrow just in front of the chamber I, so that the seed may be dropped into it before it has been partially filled by the falling in of its sides. To the beam A, in the rear of the hopper B, is attached a plow, M, in such a position as to fill the furrow opened by the plow L, and thus cover the seeds. N are the handles, one of which is attached to the beam A, and the other to the outer side of the hopper B, and which are connected by a round in the ordinary manner.

Having thus described our invention, what we claim as new, and desire to secure by Letters Patent, is—

The combination of the wheel D, shaft C, curved arms E E, the slotted plunger F, spring G, and pivoted spring-plates J, for closing the mouth of the hopper, as shown and described.

LAFAYETTE E. ASKEW.
WILLIAM H. SANGSTER.

Witnesses:
LOUIS JONES,
PERUVIA JONES.